J. H. ARMSTRONG.
Tapping Attachment for Barrels and other Vessels.

No. 213,159.   Patented Mar. 11, 1879.

Witnesses.
Otto Hufeland
William Meiller

Inventor
James H. Armstrong.
by
Van Santvoord & Hauff
his attorneys

UNITED STATES PATENT OFFICE.

JAMES H. ARMSTRONG, OF NEW YORK, N. Y.

IMPROVEMENT IN TAPPING ATTACHMENTS FOR BARRELS AND OTHER VESSELS.

Specification forming part of Letters Patent No. 213,159, dated March 11, 1879; application filed February 5, 1879.

*To all whom it may concern:*

Be it known that I, JAMES H. ARMSTRONG, of the city, county, and State of New York, have invented a new and Improved Tapping Attachment for Barrels or other Vessels, which invention is fully set forth in the following specification, reference being had to the accompanying drawings, in which—

Figure 1:
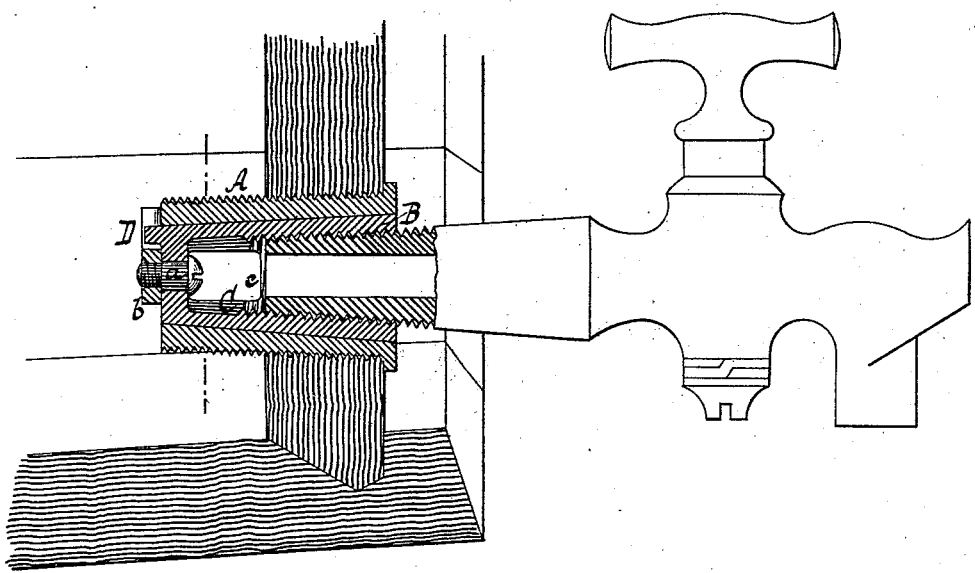
Figure 2:
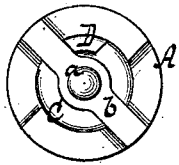
Figure 3:
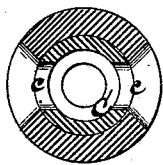
Figure 4:
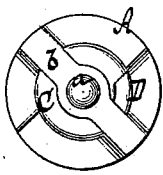
Figure 5:
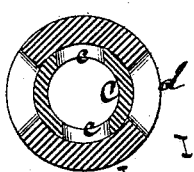

Figure 1 represents a longitudinal section of my attachment applied to a barrel. Figs. 2 and 3 show, respectively, an end view and cross-section thereof when the valve is closed. Figs. 4 and 5 are similar views thereof when the valve is open.

Similar letters indicate corresponding parts.

The object of my invention is to produce a device for attachment to barrels or other vessels, and especially those containing beer or other effervescent liquids, whereby the introduction of the faucet is facilitated, and loss of liquid prevented during the operation of tapping.

It consists in a tapping attachment in which are combined a bush fitted to the tap-hole, a rotating bush-lining having an internal tapering screw-thread fitted to the thread of a faucet, a valve to close the inner end of the bush, operated by the rotating bush-lining, and having openings adapted to register with holes in the bush, and a stop to regulate the motion of the lining or the valve, so that when a faucet is screwed into the bush-lining the latter remains stationary until the faucet becomes wedged or tightened therein, when the lining turns with the faucet and the valve is opened, while, when the faucet is unscrewed, the bush-lining is turned back and the valve is closed, the same remaining closed during the removal of the faucet, as well as after its removal.

In the drawings, the letter A designates the bush. B is the bush-lining, C the valve, and D the stop, of my attachment. The bush A is open at both ends, and is fitted to the tap-hole of the barrel or other vessel to which my attachment is to be applied, the same being provided with an external screw-thread for the purpose of fastening the same therein.

The lining B is fitted in the bush A, and the valve C is formed by the rear end of the lining, where the lining is closed, and provided with lateral openings *c*, adapted to register with holes *d*, formed in the bush; but it is obvious that said valve can be made separately, being, however, in all cases, operated by means of the bush-lining.

The valve portion C of the lining is attached to the bush A at its rear end by means of a central screw, *a*, which forms an axis, upon which the lining and valve rotate, the bush being provided with a cross-bar, *b*, for the reception of this screw.

The inner surface of the lining B is tapered, and provided with a screw-thread of corresponding pitch to the screw-thread of an ordinary faucet, as indicated in Fig. 1.

The stop D acts conjointly with a counter-stop formed by the cross-bar *b*, and serves to limit the motion of the lining or valve B or C, the same being so arranged that in one position of the lining the valve is open, the openings *c* being made to register with the holes *d*, while in another position of the lining the openings *c* and the holes *d* are at different points and the valve is closed.

When a faucet is screwed into the lining B it is permitted to move a certain distance inward before the lining turns therewith—that is to say, the lining remains stationary until the faucet becomes wedged or tightened therein. This is due to the tapering form of the lining or its thread. When, however, the faucet becomes wedged or tightened in the lining B, the same turns therewith, but is permitted to turn only a sufficient distance to open the valve C, when it is arrested by the stop D, so that the valve remains in an open condition if the faucet should be forced in beyond the position it occupies when the valve is opened, while, in like manner, the valve is closed and remains closed during and after the removal of the faucet.

What I claim as new, and desire to secure by Letters Patent, is—

A tapping attachment for barrels or other vessels, consisting of a bush fitted to the tap-hole, a bush-lining having an internal screw-thread fitted to the thread of a faucet, a valve to close the inner end of the bush, operated by the bush-lining, and having openings adapted to register with holes in the bush, and a stop to regulate the motion of the lining or the valve, all combined and adapted to operate substantially as described.

In testimony that I claim the foregoing I have hereunto set my hand and seal this 27th day of January, 1879.

JAMES H. ARMSTRONG. [L. S.]

Witnesses:
W. HAUFF,
E. F. KASTENHUBER.